United States Patent
Förster

[11] 3,763,423
[45] Oct. 2, 1973

[54] MAGNETIC PARTICLE FLAW DETECTOR INCLUDING SHIELD MEANS TO PROTECT PREVIOUSLY TESTED SURFACES

[76] Inventor: Friedrich M. O. Förster, Grathwohl Strasse 4, Reutlingen, Germany

[22] Filed: Apr. 5, 1972

[21] Appl. No.: 241,159

[52] U.S. Cl. ............................................. 324/38
[51] Int. Cl. ........................................ G01r 33/12
[58] Field of Search ............................. 324/37, 38

[56] References Cited
UNITED STATES PATENTS

| | | | |
|---|---|---|---|
| 2,990,512 | 6/1961 | Gewartowski et al. | 324/38 |
| 3,243,875 | 4/1966 | Illo | 324/38 |
| 3,534,258 | 10/1970 | Forster | 324/37 |
| 3,614,604 | 10/1971 | Reinshagen | 324/38 |
| 3,670,239 | 6/1972 | Shiraiwa | 324/37 |

FOREIGN PATENTS OR APPLICATIONS 1,046,739  10/1966  Great Britain ........................ 324/38

Primary Examiner—Robert J. Corcoran
Attorney—George J. Netter et al.

[57] ABSTRACT

A pair of magnetizing plates are located so that a conveyed workpiece will move past the plate cores and flux applied to two lower side surfaces of the workpiece. A magnetic powder material is applied downwardly onto the workpiece upper parts and collects at stray field sites identifying defects. A second set of magnetizing plates are located farther along the path of movement to direct flux onto upper parts of the workpiece while sprayed magnetic powder is directed onto the lower parts for marking any defects that may occur on those surfaces. Shields restrict the deposition of powder to appropriate regions. The magnetic powder may be admixed with an adhesive in order to increase adhesion of the powder particles to the workpiece surface.

In still another form, the workpiece is heated as the workpiece moves along its path before testing in order to speed up drying of the surface and thus adhesion of the particles to defect. The magnetic powder may be heated also to accelerate action.

7 Claims, 5 Drawing Figures

MAGNETIC PARTICLE FLAW DETECTOR INCLUDING SHIELD MEANS TO PROTECT PREVIOUSLY TESTED SURFACES

The present invention relates generally to non-destructive testing of metal parts for detects, and, more particularly, to the magnetic testing of ferromagnetic workpieces of substantial size and thickness.

BACKGROUND

Copending U.S. Pat. application Ser. NO. 178,302, NON-DESTRUCTIVE TESTING APPARATUS FOR FERROMAGNETIC MATERIALS by Friedrich M. O. Förster, filed Sept. 7, 1971, relates to the testing of metal parts by the use of the so-called magnetic stray flux method, in which the magnetization of the workpieces is accomplished by relatively thin ferromagnetic plates having their edges arranged in the vicinity of and opposed to the steel parts. Windings provided on the metal plates are energized by an A.C. current to effect magnetic excitation of a workpiece as it is moved therepast.

In using the technique of the above referenced copending application for testing billets having a square cross-section, for example, a pair of magnetizing plates apply an alternating magnetic field to opposite sides of the billet while a spraying device directs magnetic powder onto the billet such that any emerging stray flux caused by a defect will produce a collection of the powder at the defects thereby forming visible strands identifying the defect location. As disclosed in that application, the billet or workpiece is conveyed along a path with a flat surface directed upwardly and generally horizontally disposed. Only one of the four surfaces is actually tested at any one time, requiring rotation of the billet and passage through the same or similar testing stations several times in order to test the entire workpiece surface for defects.

SUMMARY OF THE INVENTION

In accordance with the practice of the present invention an elongated workpiece having a square or rectangular cross-section is conveyed longitudinally with an edge directed upwardly, whereby two immediately adjacent side surfaces are also directed generally upwardly and the other side surfaces face downwardly. A pair of plate magnetizing means are located so that the conveyed workpiece will move past the plate cores while magnetic flux is applied to each of the two lower side surfaces of the workpiece. At the same time a pressurized quantity of mangetic powder is applied downwardly onto the workpiece upper edge which causes it to flow over the two generally upwardly directed side surfaces of the workpiece and collect at the stray field sites identifying those regions as defects. A second set of plate magnetizing means are located farther along the path of movement to direct magnetic flux onto the upper side surfaces of the workpiece while pressurized streams of magnetic powder are directed onto the tow lower side surfaces for marking any defects that may occur on those surfaces.

In a further form of the invention, the magnetic powder may be admixed with an adhesive in order to increase the adhesion of the powder particles to the workpiece surface. In still another modification the workpiece is heated by high frequency magnetic induction as the workpiece moves along its path before testing in order to pre-warm the workpiece and the magnetic powder in order to speed up drying of the surface and thus adhesion of the particles to defect.

For elongated workpieces of circular cross-section, the upper portions of the conveyed workpiece are tested by a pair of plate magnetizing members arranged at 90° to one another and directed at the lower part of the workpiece. Magnetic powder is sprayed downwardly as before. Subsequently, a second set of 90° oriented magnetizing plates fluxes the upper part of the workpiece, and magnetic powder is sprayed onto the lower part of the workpiece.

Hexagonal parts are defect tested in a similar manner by the invention. A first pair of vertically extending magnetizing plates with beveled edges flux the surfaces of the part while magnetic powder is applied to the part upper surfaces. A second set of magnetizing plates then fluxes the part upper surface while magnetic powder is applied to the lower part reaches.

DESCRIPTION OF PREFERRED EMBODIMENTS OF THE INVENTION

Figure 1:
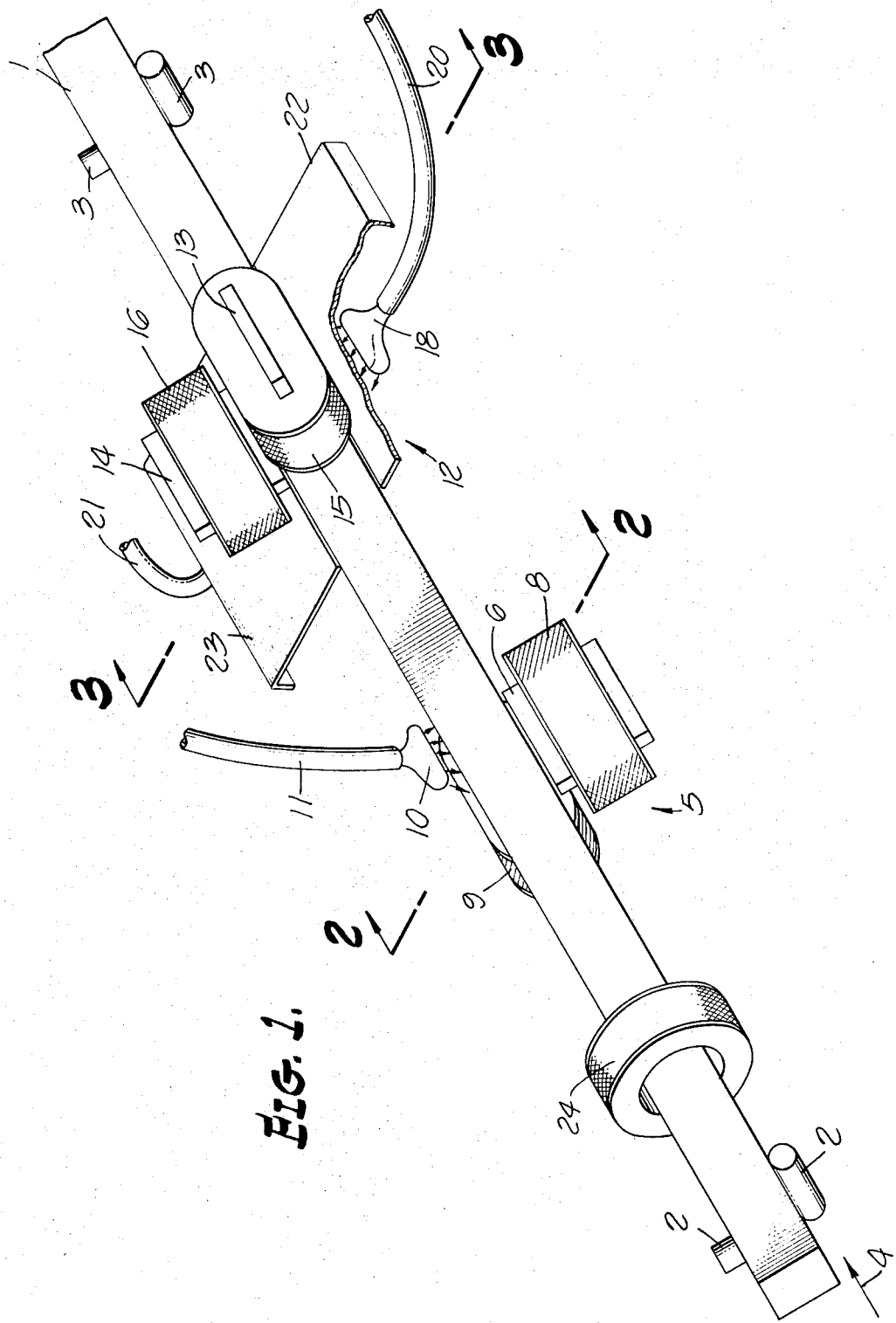
FIG. 1 depicts in schematic form the apparatus of this invention and in particular the arrangement of magnetizing plates for fluxing of a workpiece having rectangular cross-section.

With reference now to FIG. 1, an elongated workpiece having a substantially square cross-section is supported and conveyed along a longitudinal path by rollers 2 and 3 which are so arranged as to maintain a longitudinal edge of the workpiece in a generally vertically upward orientation. Drive for the rollers 2 and 3 is not shown, but is assumed to be in the direction of the arrow 4.

Figure 2:
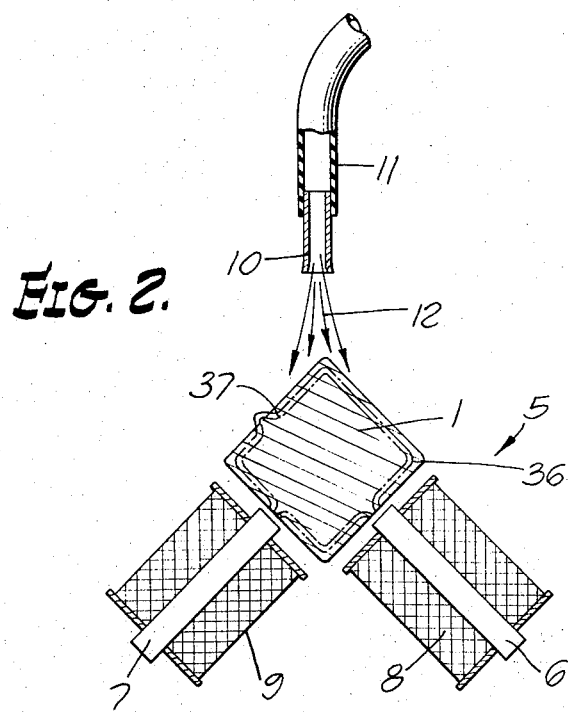
FIG. 2 is a sectional view through the magnetizing means and workpiece taken along the line 2—2 in FIG. 1.

As can be seen best by comparison of the depictions of FIGS. 1 and 2, the first test station 5 includes a pair of platelike soft iron cores 6 and 7 arranged with their edges lying closely adjacent the respective two downwardly direcd side wall surfaces of the workpiece 1. Energizing windings 8 and 9 are connected to a source of supply of A. C. power (not shown). In accordance with well known electrical theory, energization of the windings 8 and 9 by A. C. power produces a field with the workpiece or billet 1, which lies closely adjacent the surface of the workpiece as shown.

A spray nozzle 10 is interconnected with a source of supply of magnetic powder suspension or emulsion through tubing 11. Sufficient pressure is provided to the magnetic power emulsion that it will flow from the nozzle 10 onto the upper edge of the workpiece and downwardly across the two upwardly directed side surfaces of the workpiece, and, to a lesser extent, onto the other two side surfaces.

In operation, as the workpiece moves in the direction of the arrow 4 as shown in FIG. 1 it is provided with magnetic flux which traverses the path 36 shown in FIG. 2 and when the flux in the workpiece encounters a defect such as a crack 37, for example, a so-called stray flux field extends outwardly of the workpiece body causing the magnetic powder emulsion closely adjacent to be attracted toward the stray field and adhere about the defect area. In this manner, defects existing on the two major upper surface areas of the workpiece are at one time detected and marked.

Figure 3:
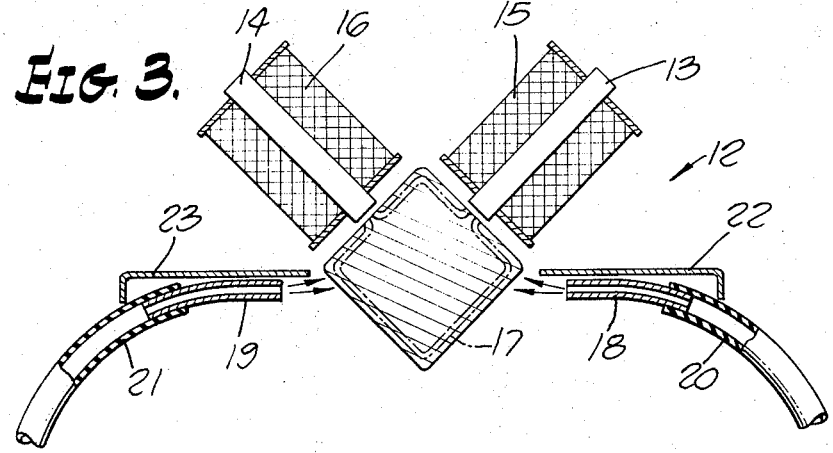
FIG. 3 is a sectional view taken along line 3—3 in FIG. 1.

As the workpiece moves further along the path of movement, it passes through another test station 12 where it encounters a further pair of platelike core members 13 and 14, having associated energization windings 15 and 16. In this case, the edges of the plates 13 and 14 are disposed closely adjacent the upwardly directed surfaces of the workpiece, namely, the surfaces that have been previously tested in station 5, with the plates oriented parallel to the workpiece long dimension. The two magnetizing plates provide a magnetic field within the workpiece closely adjacent the outer surface of the form as depicted in FIG. 3 and referenced by the numeral 17.

In station 12, a pair of spray heads 18 and 19 are interconnected via supply tubes 20 and 21 with a supply of magnetic power emulsion for directing the powered magnetic material generally horizontally onto the lower side surfaces of the workpiece. A pair of elongated shields 22 and 23 extend horizontally and slightly spaced from the horizontal side edges of the workpiece, as seen best in FIG. 3. These shields insure that the powder which is directed against the lower side surfaces of the workpiece is confined to that region and does not spray or billow upwardly onto the other portions of the workpiece.

In this manner, the two lower side surfaces of the workpiece are tested and marked by the magnetic powder in station 12.

After final testing station 12, the billet is removed from the conveying apparatus and in the usual manner the defects identified are visually examined and either removed, as by grinding, for example, or, if too extensive, the workpiece may be rejected.

It is important to note that as a result of initial testing in station 5, some powered material will accumulate in strips or stripes on the lower major surfaces of the work-piece, which are removed or wiped away by the action in station 12 of the applied magnetic powder from spray nozzles. If this were not done, fluxing of the regions including these stripes or strips could produce erroneous indications of defects.

It is of fundamental importance that the surface of the workpiece dry relatively quickly in order to prevent collection of powder emulsion containing free moving magnetic powder particles on the upper side surfaces of the workpiece when the workpiece enters the station 12. If this excess emulsion is allowed to remain, then there would be strips of magnetic powder fixed or set up on these surfaces by the magnetic flux from the magnetizing plates entering the workpiece surface and which would act exactly as stray flux thereby erroneously marking these regions as including defects. This undesirable condition can occur where the transport speed of the workpiece is sufficiently high not to allow sufficient time for the powder emulsion to flow off the workpiece.

To dry the workpiece quickly and avoid the above noted disadvantages, an annular coil 24 is provided in surrounding relation to the workpiece prior to station 5, which, when connected to a supply of A. C. current of sufficiently high frequency induces an increase in temperature in the surface of the workpiece in the neighborhood of 60°–90° C. The increase in temperature reduces the magnetic emulsion drying time to a substantial degree. It is contemplated that other types of heating may alternatively be used, such as, for example, passing the workpiece through a heating chamber, resistance heating, or any other conventional heating technique.

It is also considered within the spirit of the invention to raise the temperature of the powder emulsion prior to its deposition onto the workpiece which will markedly decrease its drying time after spraying onto the workpiece 1. Still further, the magnetic particle powder emulsion may be preheated and applied to the workpiece, the workpiece having also been preheated in accordance with one of the techniques discussed above, the combined effect of which produces a considerably reduced drying time for the powder emulsion.

Figure 4:
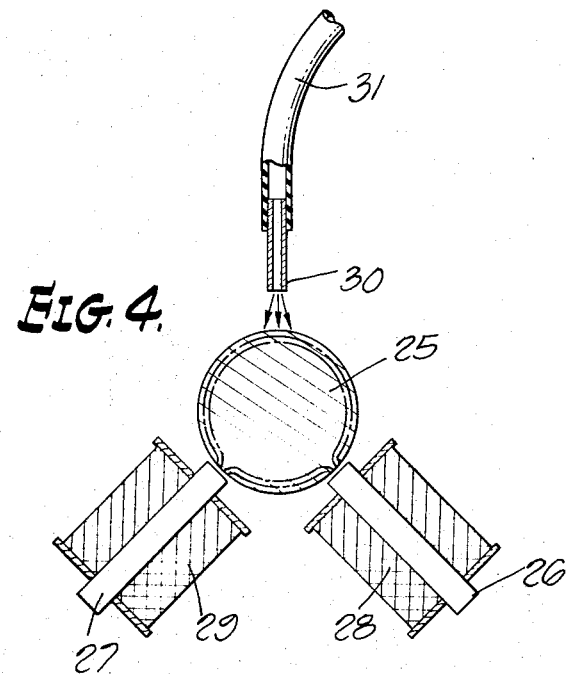
FIG. 4 is a depiction of an alternate form of the invention for use with circular cross-section workpieces.

The principles described previously herein can also be advantageously used to test for defects in elongated cylindrical workpieces such as the workpiece 25 in FIG. 4. That is, a pair of plate magnetizing cores 26 and 27 with respective energizing windings 28 and 29 have the plate edges arranged at substantially 90° to one another and immediately adjacent the lower surface of the workpiece being conveyed therepast. A spray nozzle 30 connected to a source of supply (not shown) of a magnetic powder suspension or emulsion by a tube 31, directs a stream of the powder material downwardly onto the workpiece to mark defect regions in the manner already described. In a second test station, a further set of magnetizing plates arranged 90° to one another direct a magnetic field onto the upper part of the cylindrical workpiece and a pair of magnetic emulsion sprays deliver magnetic powder onto the lower reaches of the workpiece. As before, shields may be utilized to prevent spray directed at the lower portions of the workpiece forom impinging on the upper portions.

Figure 5:
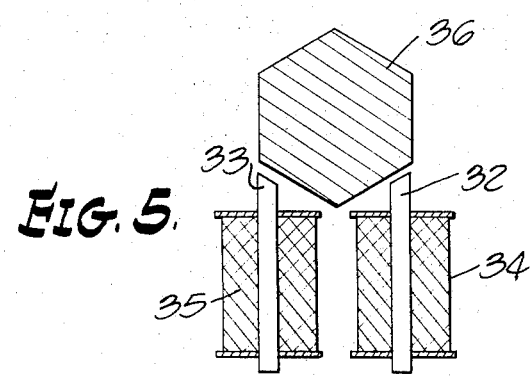
FIG. 5 is a sectional view taken through a hexagonal workpiece and energizing heads in a still further form of the invention.

FIG. 5 shows a still further embodiment particularly adapted to the testing of elongated workpieces of hexagonal cross-section. As shown there, a pair of platelike cores 32 and 33 provided with energizing windings 34 and 35, have beveled edges which are located in slightly opposed relation, respectively, to the lower side surfaces of the conveyed hexagonal workpiece 36. Magnetic powder emulsion is applied as in the previously described versions. A second set of magnetizing plates is arranged adjacent a pair of upper workpiece side surfaces with powder applied against the lower surfaces as before.

Although the techniques of the present invention have been described essentially in connection with the testing of elongated metal parts, it is contemplated that they may be advantageously used for the testing of mass produced items of great variety and shape, such as, for example, screws, nuts, bolts, forged pieces, roller bearing rings, pistons and the like.

Moreover, in the described use the magnetizing plates each included windings that were energized by A. C. current. It is considered within the scope of the invention that the pair of magnetizing plates be the two legs of a single yoke or U-shaped core.

What is claimed is:

1. Apparatus for stray field magnetic testing of elongated ferromagnetic parts for defects, comprising:
   a conveyor for moving the parts longitudinally without rotation thereof along a definite path;
   a first test station located along said path including,
      a first pair of elongated magnetizing means, each having an elongated magnetizing surface arranged with the long dimension thereof generally parallel to the path of movement and having a width substantially less than the corresponding dimension of the parts being tested for directing magnetic flux onto transversely spaced lower portions of the parts as they move therepast,
      means for dispensing a magnetic powder material onto the upper surface portions of the parts in the regions thereof being fluxed;
   a second test station located along the path of movement and spaced from said first station including,
      a second pair of such elongated magnetizing means for directing magnetic flux onto the upper portions of the parts as they move therepast,
      means for spraying a magnetic powder material generally horizontally onto the lower portions of the parts, and
      shield means located in said second test station to prevent the sprayed magnetic powder material from coming into contact with upper portions of the parts to which magnetic powder material had been applied in the first station.

2. Apparatus as in claim 1, in which said shield means comprise first and second non-magnetic shielding plates mounted with a respective edge of each in slightly spaced relation to opposite sides of said parts.

3. Apparatus as in claim 1, in which said magnetic powder material comprises a magnetic powder emulsion, and further means are provided for heating the parts prior to entry into said stations.

4. Apparatus as in claim 1, in which said magnetic powder material is heated before being applied to the parts.

5. Apparatus as in claim 1, in which the magnetic powder material includes an adhesive for increasing cohesion of magnetic powder particles to one another and adhesion of the magnetic powder material to the parts.

6. Apparatus as in claim 1, in which the first and second pairs of elongated magnetizing means each include a yokelike construction, the legs of which form the elongated magnetizing means.

7. Apparatus for defect testing of elongated ferromagnetic workpieces having four or more longitudinally extending side surfaces separated by corresponding edges, comprising:
   means for conveying the workpiece along a straight path substantially parallel to the side edges while maintaining one of said side edges vertically upright;
   a first pair of magnetizing means each having an elongated flat magnetizing surface of width substantially less than that of the workpiece, said magnetizing surfaces being disposed in closely spaced relation to a respective pair of immediately adjacent workpiece lower side surfaces;
   spray means located above said first magnetizing means and downwardly directed onto the workpiece vertically upright edge for spraying a magnetic powder emulsion thereon;
   a second pair of magnetizing means spaced along the line of movement from said first means and having a respective pair of magnetizing surfaces disposed slightly spaced from the adjacent side surfaces at each side of the vertically upright workpiece edge;
   further spray means for dispensing pressurized magnetic powder emulsion horizontally onto the workpiece lower portions as the workpiece is being magnetically fluxed by said second magnetizing means; and
   shield means for preventing magnetic powder emulsion from said further spray means from being deposited onto the workpiece upper portions.

* * * * *